United States Patent [19]
Waldron

[11] 3,914,667
[45] Oct. 21, 1975

[54] RATE OF RISE TRIPPING DEVICE
[75] Inventor: James E. Waldron, Drexel Hill, Pa.
[73] Assignee: I-T-E Imperial Corporation, Spring House, Pa.
[22] Filed: Mar. 27, 1972
[21] Appl. No.: 238,056

[52] U.S. Cl. ............................................ 317/36 TD
[51] Int. Cl.[2] .......................................... H02H 3/08
[58] Field of Search .......... 317/36 TD, 50; 328/132; 310/DIG. 3

[56]  References Cited
UNITED STATES PATENTS
| | | | |
|---|---|---|---|
| 3,119,070 | 1/1964 | Seliger | 328/132 X |
| 3,434,011 | 3/1969 | Zocholl | 317/36 TD X |
| 3,546,537 | 12/1970 | Jump et al. | 317/36 TD |
| 3,558,991 | 1/1971 | Brandt et al. | 317/58 |

OTHER PUBLICATIONS
The Bell System Technical Journal, May 1959 pp. 868–869.

Primary Examiner—J. D. Miller
Assistant Examiner—Harry E. Moose, Jr.
Attorney, Agent, or Firm—Ostrolenk, Faber, Gerb & Soffen

[57] ABSTRACT

A device for distinguishing between overload transients and transients which occur through normal usage of the system. Instantaneous current flow is detected by a sensor which may preferably be a Hall-effect device. This signal is amplified and differentiated to develop a signal representative of the rate-of-rise of the current. Rate-of-rise signals above a predetermined level are employed to activate a timer which times out only if the rate-of-rise signal persists for a predetermined time period, at which time a break or tripping operation is initiated. The timing circuit prevents normal system transients from erroneously initiating a tripping operation.

1 Claim, 15 Drawing Figures

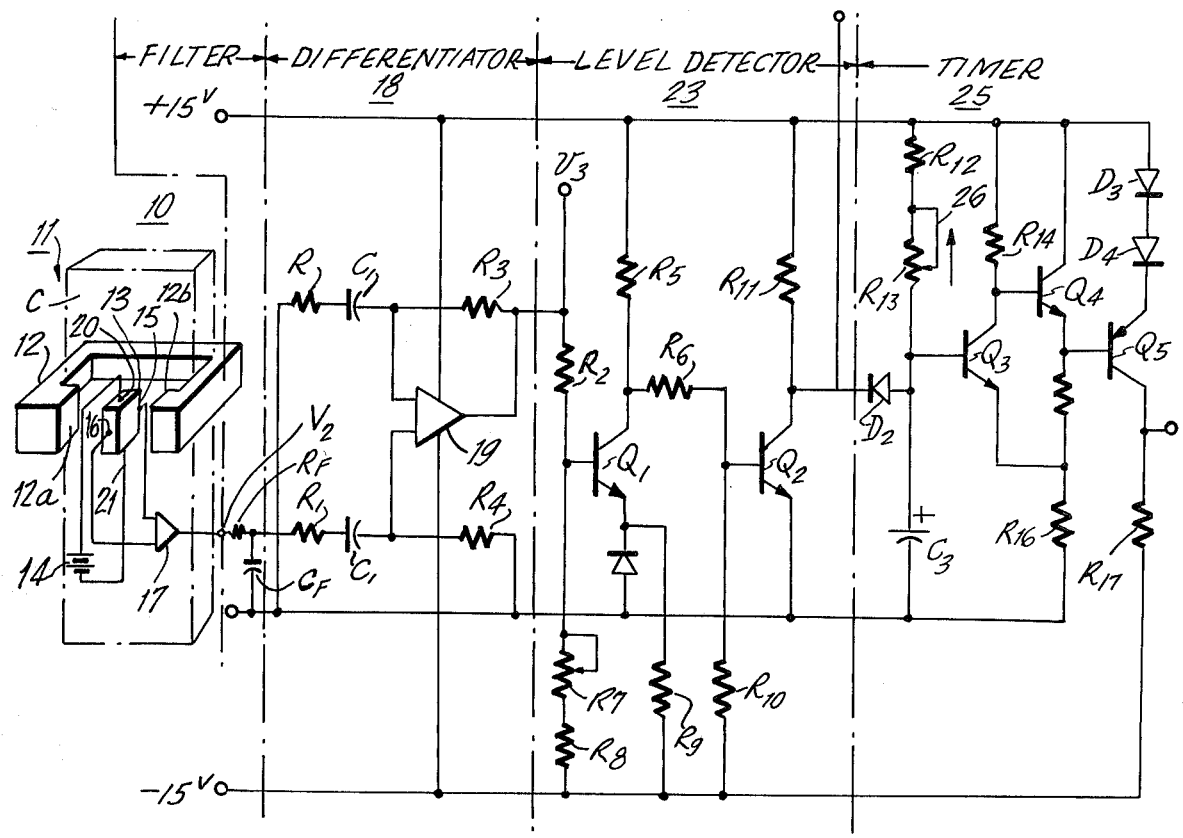
FIG. 1
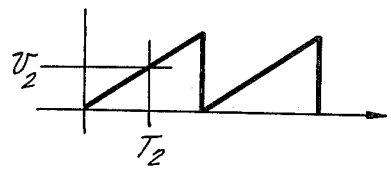
FIG. 4a
RATE OF RISE RELAY
| 1 | 2 | 3 | 4 | 5 | 6 | |
|---|---|---|---|---|---|---|
| $V_2$ V | $T_2$ sc | $\frac{\Delta V_2}{\Delta T_2}$ | $V_3 = \frac{\Delta V_2}{\Delta T_2}$ | $V_3$ (FINAL) | TIME DELAY | |
| 8.0 | 0.5 | 16.0 | 3.2 | 3.2 | 0.03 | |
| 7.0 | 0.5 | 2.0 | 0.4 | 0.45 | 0.03 | TIMER SET MIN, LD SET MIN |
| 4.0 | 0.5 | 8.0 | 1.6 | 1.7 | 0.54 | |
| 4.0 | 1.0 | 4.0 | 0.8 | 0.8 | 0.54 | TIMER SET MAX. |
FIG. 4b

RATE OF RISE TRIPPING DEVICE

The present invention relates to overload detection and tripping devices and more particularly to a novel rate-of-rise tripping device for distinguishing between overload conditions and other transient conditions encountered during normal operation of the system.

BACKGROUND OF THE INVENTION

The present invention relates to a rate-of-rise device employed to detect fault currents. Such systems are especially advantageous for use in D.C. traction systems employed for powering electrified railway systems. It is important to provide overload protection for electrified railway systems to provide protection against damage to the system. However, devices employed to sense overload conditions and thereby provide tripping operations must be capable of distinguishing between such overload conditions and transient conditions which may occur as a result of normal operation of the system. Faults occurring in the electrified rails of such systems produce currents which can be of the same order of magnitude as train-starting currents thus making fault conditions incapable of detection by conventional overcurrent devices.

Conventional systems normally employ transformers inductively coupled to the DC bus to produce an output approximating the rate-of-rise of the current. Electromechanical relays are employed to be actuated by the output of the transformer means.

The disadvantages of the prior art mechanical systems reside in the fact that the transformer output merely approximates the rate-of-rise of current and the electromechanical relays, being slow acting, are not capable of being reset rapidly enough to provide reliable operation so as to trip only in the presence of overload conditions as opposed to transient conditions which may occur during normal operation of the system.

BRIEF DESCRIPTION OF THE INVENTION

The basic concept of the present invention resides in the provision of a discrimination capability based upon the rate-of-rise of the current in the protected line section, which discrimination operation monitors both current magnitude and time. Briefly stated, if the current being monitored continues to rise for a preset duration, the device of the present invention responds to open the appropriate circuit breaker so long as the rate of rise exceeds a preset magnitude.

The present invention is comprised of a sensor in the form of a Hall-effect device whose voltage output is directly proportional to current flow in the DC system being protected. The voltage output signal of the sensor is amplified and differentiated to obtain a rate-of-rise output. A level detector determines when the differentiated output achieves a predetermined level in order to trip a timing circuit. The timing circuit begins to time out and will do so in order to trigger a circuit breaker interrupting operation only if the rate-of-rise condition persists over the entire time-out period. If the rate-of-rise condition fails to persist over the predetermined time period, the timer automatically and instantaneously resets itself in readiness for exerting control over the next rate-of-rise condition. Appropriate setting of the level detection device and the timing device assures accurate and reliable discrimination between overload conditions and transient conditions which may occur during normal operation of the system.

OBJECTS OF THE INVENTION

It is therefore one primary object of the present invention to provide a novel sensing and tripping means for protecting a circuit against damage from overload conditions while at the same time preventing erroneous circuit breaker tripping operations due to transient conditions which may occur during normal operation of the system being protected.

Another object of the present invention is to provide a device of the type described which comprises means for developing a rate-of-rise signal, means for detecting when the rate-of-rise signal achieves a predetermined level and means for initiating a trip operation only under those conditions in which the predetermined rate-of-rise level signal persists for a predetermined time interval.

BRIEF DESCRIPTION OF THE FIGURES

The above as well as other objects of the present invention will become apparent when reading the accompanying description and drawings in which:

FIG. 1 is a schematic diagram of a sensor and tripping circuit embodying the principles of the present invention;

FIG. 4a is a table indicating theoretical and experimental values obtained in evaluating the circuitry of FIG. 1; and FIG. 4b is a plot of a waveform employed in performing the tests set forth in the table of FIG. 4a.

DETAILED DESCRIPTION OF THE FIGURES

Figure 2A:
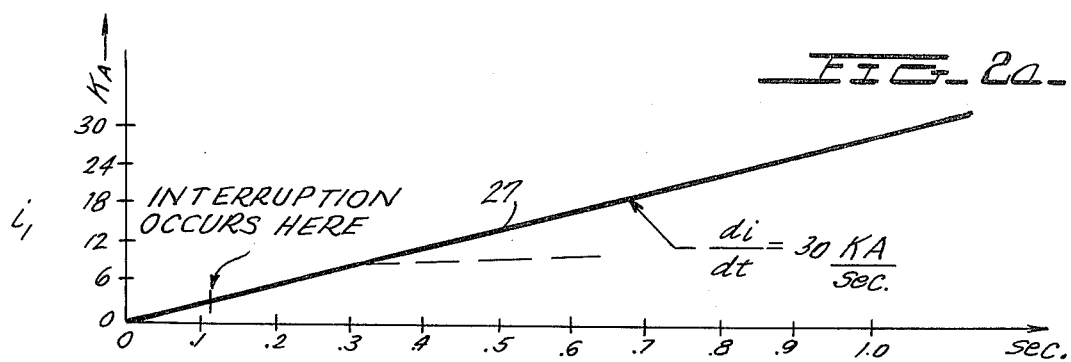
FIGS. 2a–2f are plots of curves useful in describing a tripping operation performed by the apparatus of FIG. 1.
Figure 2B:
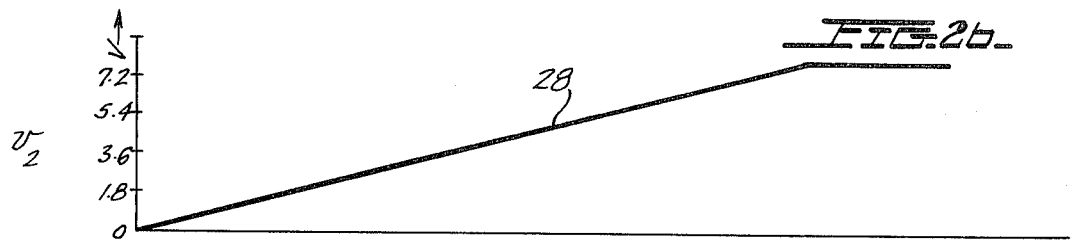

A circuit 10 designed in accordance with the principles of the present invention is shown in FIG. 1 and is comprised of a sensor 11 which is a Hall-effect device capable of providing an output voltage directly proportional to current flow in the conductor C of the system being monitored. Current flow through conductor C generates a magnetic field which is concentrated by the magnetic core 12 having a gap across its pole faces 12a and 12b. A hall element 13 positioned within the gap is provided with a constant input current $I_1$ from a constant energy source 14. An output voltage $V_2$ is developed across the output terminals 15,16 of the Hall-effect device.

Output voltage $V_2$ is proportional to the instantaneous product of the input current $I_1$ and the flux density B between pole faces 12a and 12b in accordance with the expression $V_1 = K I_1 B$.

The advantageous employment of a rate-of-rise tripping device is that track-faults may be detected and the system relieved of the fault condition long before fault current achieves overload magnitudes. Typical track-faults, for example, occurring at a distance of 1.5 miles from the substation may yield steady state currents of 10KA with a time constant of 0.30 seconds. The relay is required to discriminate between track faults and train starts. The train-starting current can be of less duration than a fault, typical values being a succession of steps of the order of IKA with a time constant of 0.05 seconds for each step.

The Hall device described hereinabove is chosen to have an output of 0.09 volts per multiple of sensor rating, but will saturate at about 5 times rating. Therefore, for a 6KA sensor, the Hall output will be 0.36 volts at a current of 24 KA.

The output voltage $V_1$ of Hall device 11 is coupled into an amplifier 17 preferably having a gain of 20. Thus, the input to the next stage (differentiator 18) is 1.8 volts per multiple of sensor rating (i.e. 20 times the output capability of the Hall device). Thus, $$v_2 = \frac{1.8}{I_s} i_1, \quad 0 < |i_1| < 5I_s$$

Where:

$i_1$ is the breaker primary current, and $I_S$ is the sensor rating. Also $i_1$ is positive in the tripping direction and negative in the opposite direction, and $V_2$ has the instantaneous polarity of $i_1$.

The output voltage of $v_2$ of amplifier 17 is filtered to remove the high-frequency components caused by the ripple commonly encountered in power-rectified load currents. The filter is composed of $R_F$ and $C_F$ and is designed as a lowpass type, with cut-off at 200 CPS.

The differentiator circuit preferably comprises an amplifier 19, and its feedback elements $R_1$, $C_1$, $R_3$ and $R_4$ as shown in FIG. 1. This connection performs a function which closely approximates the derivative of $v_2$. The resistors R and $R_1$ contribute a slight "delay" which is useful in rejecting high-frequency system transients. Preferably, the parameters of the differentiator design are chosen so that the response, $v_3$, to a fault on the d.c. power system is of $Q_2$ whose collector is coupled to the input of a timing circuit 25, which input comprises the cathode of a diode $D_2$. The timing circuit 25 comprises a series circuit incorporating resistor $R_{12}$, potentiometer $R_{13}$ having adjustable arm 26 and capacitor $C_3$. The arm 26 of potentiometer $R_{13}$ provides a timer to be adjusted for time durations between 0.05 and 0.20 seconds. The output of transistor $Q_2$ causes charging of $C_3$ when the collector level of $Q_2$ is of sufficient magnitude. After a predetermined time delay the voltage at the common terminal between diode $D_2$ and capacitor $C_3$ reaches a predetermined level to trigger the operation of transistors $Q_3$, $Q_4$ and $Q_5$ to provide an output signal at the collector $Q_5$ which appears at output terminal 27 which, in turn, is coupled to the trigger input of a high speed tripping device such as, for example, a circuit breaker of the type described, for example, in U.S. Pat. No. 3,558,991, issued Jan. 26, 1971 and assigned to the assignee of the present invention.

As soon as $Q_2$ is rendered conductive, capacitor $C_3$ discharges through the conducting transistor and $D_2$ to provide automatic and substantially instantaneous resetting of the timing circuit. Time-out of the timing circuit therefore does not occur unless the rate-of-rise condition has exceeded a predetermined level for the delay setting of the timer which may be any value between 0.05 and 0.20 seconds.

FIGS. 2a-2f show a family of curves useful in explaining the operation of the device of FIG. 1 in the presence of an overload condition, whereas FIGS. 3a-3f show a family of curves useful in explaining the operation of the circuit of FIG. 1 in the case of a transient condition which may occur as a result of normal usage of the system. It will be understood that the actual waveform of the fault current is an exponential func- $$V_3(t) = \frac{1.8 E_1}{L_1 I_s} \times 2000 \left[ \frac{e^{-50t}}{\left(\frac{Z_1}{L_1} - 50\right) 150} - \frac{e^{-\frac{Z_1}{L_1} t}}{\left(50 - \frac{Z_1}{L_1}\right)\left(200 - \frac{Z_1}{L_1}\right)} - \frac{e^{-200t}}{150\left(200 - \frac{Z_1}{L_1}\right)} \right]$$

Where $E_1$ is the power system voltage $L_1$ is the power system inductance $Z_1$ is the power system resistance and $I_S$ is the sensor rating.

The output of differentiator 18 is coupled through a resistor $R_2$ to the base of transistor $Q_1$ which, together with transistor $Q_2$ comprise a level detector circuit 23. Also provided in the level detector circuit is an adjustable resistor $R_7$ to adjust the input voltage level which actuates the level detector circuit, in a range from 0.2 to 2.0 volts. This corresponds to $$V_3 = .06 \frac{dI_1}{dk} .2^v \text{ (min)}$$

$$\frac{dI_1}{dk} = \frac{.2}{.06} = 3.3 \frac{KA}{sec} \text{ (min), or } 33 \frac{KA}{sec} \text{(max)}$$

The collector of $Q_1$ is coupled through $R_6$ to the base tion. For the purpose of illustrating the principle of this device, the exponentials are represented in FIG. 2 as ramp functions.

FIG. 2a shows a curve 27 wherein the rate-of-rise of current $i_1$ in the conductor C being monitored has a slope, for example, of 30KA per second. This current causes a voltage $v_2$ to be developed by the output of the hall device, 13 as represented by curve 28. It can be seen that the curves 27 and 28 have substantially identical slopes.

Figure 2C:
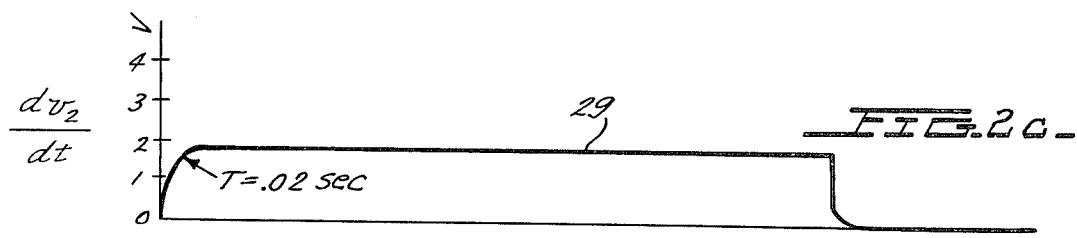
Figure 2D:
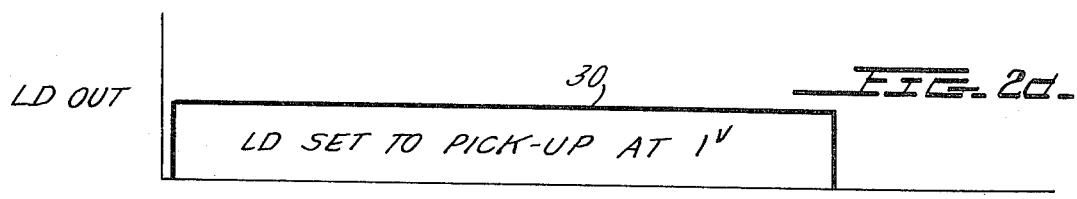

Curve 29 of FIG. 2c represents the differentiated value of the output of the hall device 13 which is developed by differentiator circuit 18. For the example given, the output $v_3$ of differentiator 18 causes operation of level detector 23 at a time 0.02 seconds after initiation of the current rise $i_1$. Curve 30 represents the output of level detector 23, as shown in FIG. 2d. The output of level detector 23 (appearing at the collector of $Q_2$) remains high from a time 0.02 seconds after time $t(0)$ and is maintained at this level for a period longer than the timer setting, here shown as 0.1 second.

Figure 2E:
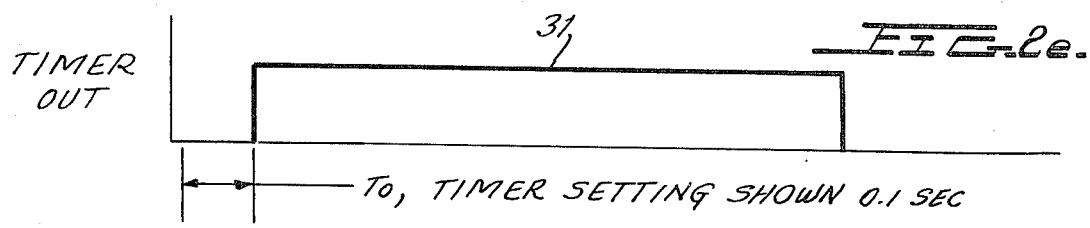
Figure 2F:

During this time, transistor $Q_2$ is in the nonconductive state, enabling capacitor $C_3$ to being charging. Curve 31 of FIG. 2e represents the output of timing circuit 25. Capacitor $C_3$ begins charging 0.02 seconds after time $t(0)$ and times out after 0.10 seconds, at which time the output (collector of transistor $Q_5$) goes positive to develop the trip signal represented by waveform 32 in FIG. 2f. Capacitor $C_3$ begins charging as soon as transistor $Q_2$ is turned off. The voltage at the common terminal between $C_3$ and $D_2$ raises to a level sufficient to turn on $Q_3$ 0.1 seconds after the level detector picks up (in the example given at 1.0 volts). The conduction of transistor $Q_3$ turns off transistor $Q_4$ which, in turn, turns $Q_5$ on. The level at the collector of $Q_5$ rises to provide the trip signal as shown by waveform 32 of FIG. 2f.

The plots of FIGS. 3a-3f represent the operation of the circuit of FIG. 1 during the occurrence of a train start.

Figure 3A:
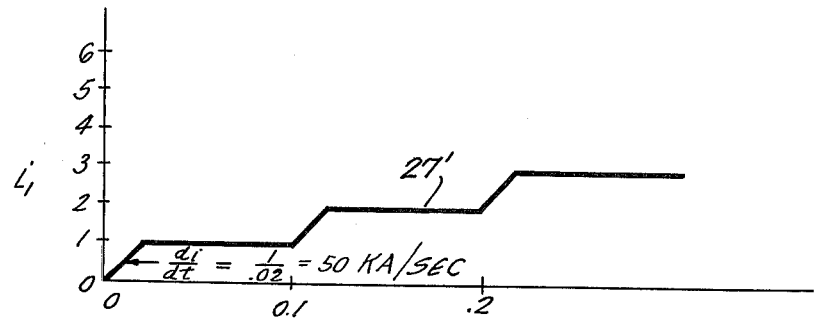
FIGS. 3a–3f are plots of curves useful in describing the sensing of a normal transient condition by the circuitry of FIG. 1.
Figure 3B:
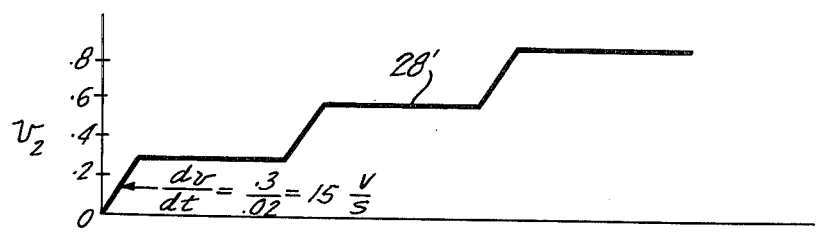
Figure 3C:
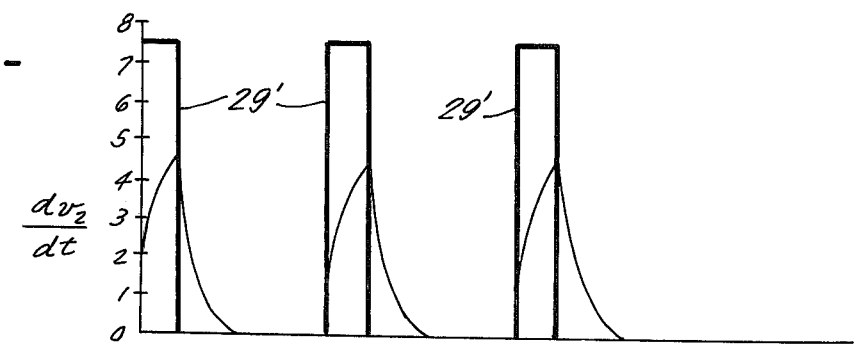
Figure 3D:
Figure 3E:
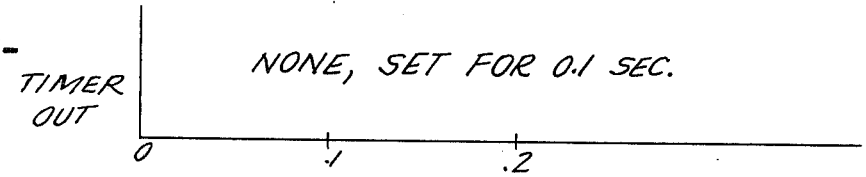
Figure 3F:
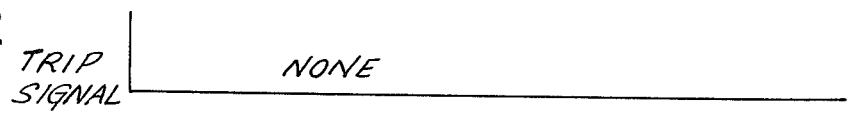

Curve 27' represents the transient or rate-of-rise conditions which may occur during start up. Curve 28' of FIG. 3b shows the voltage output of the Hall-effect device. The sloping portions of curve 27' have a slope equal to 50KA per second. The sloping portions of curve 28' have a slope of 15 volts per second. The curve of FIG. 3c shows the outputs of the differentiator circuit 18 (curve 29). FIG. 3d shows the curve 30' which represents the output of level detector 23. With the timer 25 being set for a time out period of 0.10 seconds it can be seen from FIG. 3e that timing circuit 25 provides no output. This is due to the fact that the rise time for each of the sloping portions of curve 27' have a duration of the order of 0.02 seconds which is insufficient to cause time out of the timing circuit whose time duration is set at 0.10 seconds. In addition thereto, timer 25 is rapidly reset at the trailing edge of each square pulse shown in FIG. 3d so that the sloping portions of curve 27' have no cumulative effect upon the operation of the timing circuit, as would be the case in electromechanical devices which are incapable of resetting instantaneously.

Experimental tests to verify the successful operation of the circuit of FIG. 1 were performed and the results of these tests are given in FIG. 4a. The voltage $v_2$ was simulated through the use of a sawtooth output whose waveform is that shown in FIG. 4b.

Column 1 represents the maximum value of $v_2$; column 2 represents the time required to reach maximum value; column 3 represents the rate-of-rise; column 4 represents the amplified rate-of-rise obtained theoretically and column 5 represents the actual rate-of-rise obtained experimentally. Column 6 represents the time delays actually measured during the test.

It can be seen from the foregoing description that the present invention provides a novel rate-of-rise circuit for providing a tripping signal to initiate the operation of a circuit breaker or other device so as to cause a tripping operation only in the presence of an overload condition while preventing the occurrence of a false tripping operation in the presence of a transient condition which may be experienced during normal operation of the system. Whereas the description set forth herein teaches the use of a hall device as a sensor means, it should be understood that any other device yielding similar operating characteristics may be substituted therefor without departing from the scope of the present invention.

Although there has been described a preferred embodiment of this novel invention, many variations and modifications will now be apparent to those skilled in the art. Therefore, this invention is to be limited, not by the specific disclosure herein, but only by the appending claims.

What is claimed is:

1. Means for initiating a trip operation in response to current conditions of predetermined rise times and persistency in a circuit being monitored, comprising:

first means responsive to the instantaneous current in said conductor for generating a signal representing said instantaneous current value;

second means for differentiating the output of said first means to generate a signal only when the rate of change of the output of said first means is not zero;

low pass filter circuit means for coupling said first and second means to remove high frequency components from the output signal of said second means;

third means coupled to said second means for generating a constant level output only when the output of said second means achieves a predetermined magnitude; said constant level output being maintained only so long as the output of said second means is at least equal to said predetermined magnitude;

timing means coupled to said third means actuated by said constant level signal for initiating a timing period and including means for generating a trip initiating signal a predetermined time interval after said third means generates an output if said constant level output persists for a period at least as long as said predetermined time interval;

said third means including means for instantaneously resetting said timing means when the rate of rise of the output of said first means is zero;

said timing means including adjustable means for setting said predetermined time interval to be insensitive to rate of rise changes which fail to persist for said predetermined time interval;

said timing means includes a capacitor coupled to said adjustable means and adapted to be charged by said constant level output at a rate which is a function of the value of said adjustable means, and to be instantaneously discharged by said third means when said constant level output is terminated.

* * * * *